May 24, 1966 C. E. BUERKI 3,252,407
COOKING DEVICE
Filed April 23, 1964
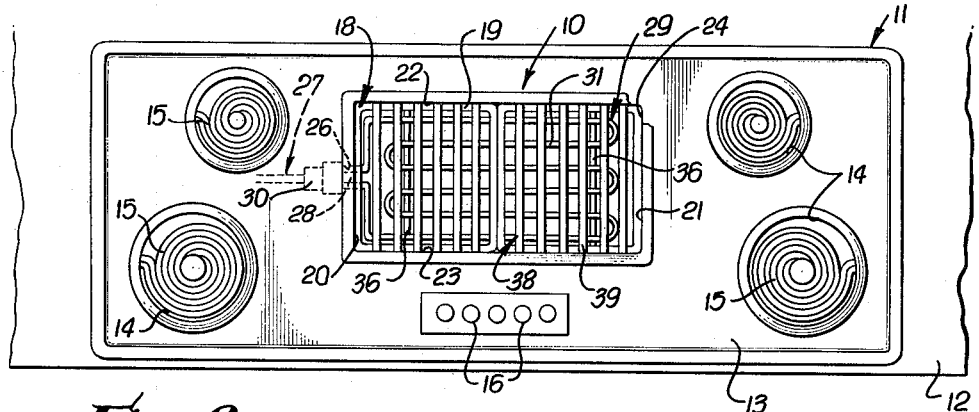
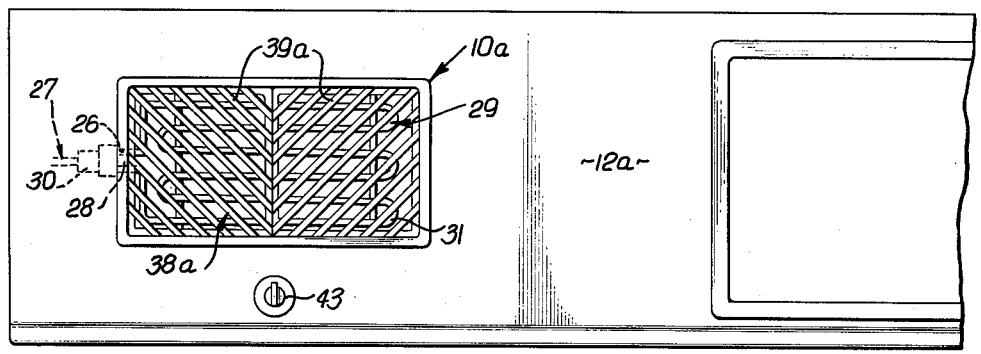
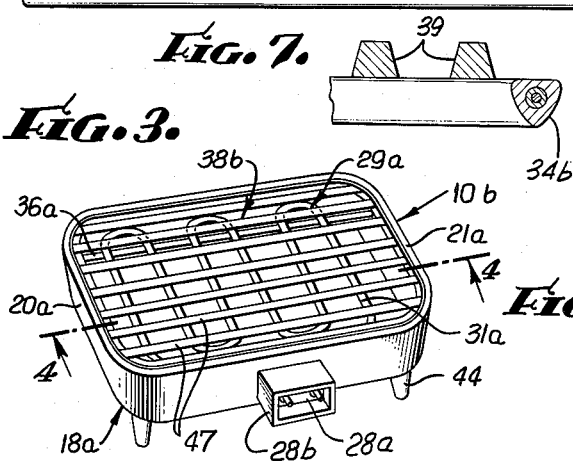
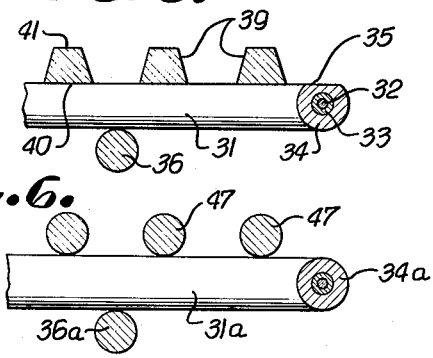
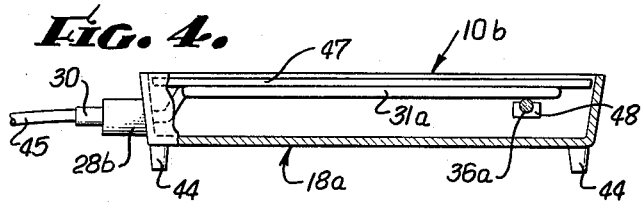
INVENTOR.
CHRISTIAN E. BUERKI
BY Huebner & Worrel
ATTORNEYS.

United States Patent Office 3,252,407
Patented May 24, 1966

3,252,407
COOKING DEVICE
Christian E. Buerki, Fullerton, Calif., assignor to Norris-Thermador Corporation, Los Angeles, Calif., a corporation of California
Filed Apr. 23, 1964, Ser. No. 362,114
6 Claims. (Cl. 99—446)

This invention relates to a cooking device for cooking edibles by broiling and more particularly to a cooking device which employs apparatus for cooking by a combination of conductive and radiant heat.

Heretofore, the cooking or boiling of edibles such as meat over a grill has been accomplished by radiant heat, with the heat passing from a heat source such as an electric resistance element, gas burner or charcoal upward between the ribs of a grill, which is spaced above the heat source, directly into the meat. Also, by this arrangement of parts, the meat in the area which contacts the grill ribs is usually cooked by a double heat source. That is, there is a double heat path with the heat source radiating to the ribs and thence carried through the ribs by conduction to the meat. The double heat path creates a loss of heat at the point where the grill ribs and the meat contact and as such have not afforded adequate "branding" or searing of the external surface of the meat.

Another form of prior art grill utilizes electric resistance rods spaced between the ribs of a grill. However, such an arrangement still has proven unsatisfactory because there is a loss of radiant heat when the heat is emanated horizontally to the ribs and thence to the meat.

An object of this invention is to provide a cooking device and means for cooking edibles employing an electric heating element which by arrangement of parts will cook through direct conductive and direct radiant heating where no or little loss of heat by conduction is experienced. It has been found that the employment of these two heat principals will more efficiently prepare meat. In other words, the radiant heat or infrared heating will penetrate the meat to adequately cook the interior portion while the conductive heat will more adequately "brand" or sear the external surfaces of the meat.

A further object of this invention is to provide a cooking device for cooking edibles where the cooking time required may be reduced by the utilization of both conductive and radiant heating principles.

Another object of this invention is to provide a cooking device for cooking edibles employing an electric resistance element encased within a metallic heat conductive sheathing and a grill, which grill is in direct contact with said sheathing at spaced intervals thereon.

Another object of this invention is to provide a cooking device for cooking edibles where the ribs of the grill are of a preferred configuration to distribute the maximum amount of heat by conduction along the ribs and yet concentrate this conductive heat at the surface which is contacted by an edible to be cooked.

A further object of this invention is to provide a grill for cooking edibles where the rod of the heating element of the grill has a preferred cross sectional configuration that will afford the maximum amount of contact with the ribs of a grill member.

A further object of this invention is to provide a cooking device for cooking edibles by direct conduction and direct radiation.

These and other objects of the invention will be made more fully apparent from a consideration of the description which follows taken in conjunction with the drawings.

In the drawings:

FIGURE 1 is a top elevational view of the cooking grill mounted in a counter-top cooking unit;

FIGURE 2 is a top elevational view of the cooking grill independently mounted in a counter-top;

FIGURE 3 is a perspective view of the cooking grill utilized as a portable kitchen utensil;

FIGURE 4 is a side elevational view partly in section of the cooking grill taken on line 4—4 of FIGURE 3;

FIGURE 5 is a detailed view partly in section of the preferred heating element and grill ribs;

FIGURE 6 is a modified form of heating element and ribs of a grill member; and

FIGURE 7 is another modified form of a heating element utilized with the cooking grill.

A cooking grill generally designated 10 is preferably mounted in a counter-top cooking range designated 11. The range 11 of the commercially available type usually includes a rough-in box, not shown, which is set into a kitchen counter 12. The rough-in box is usually capped by a cover plate 13 which is secured to the box and/or counter 12.

The cover plate 13 is also provided with a plurality of openings 14 to receive electrical heating elements 15 of any well-known type. It is also customary to provide a plurality of switches 16 mounted on the cover plate 13 to control the elements 15.

The cooking grill 10 mounted in the range 11 includes a generally rectangular pan 18 consisting of a bottom 19, end walls 20 and 21 and side walls 22 and 23. The pan 18 is mounted in the rough-in box, not seen, and the walls extend upward to the level of the cover plate 13 through opening 24 in the cover plate 13.

In order to support the grill pan 18 and cover opening 24, a trim flange 25 extending around the periphery of the walls 20, 21, 22 and 23 is provided which rests on the cover plate 13.

An opening 26, shown in phantom, is formed in the end wall 20 of the pan 18 and receives an electrical coupling member 27, shown in phantom. This member 27 includes an electrical plug 28 which mates with a socket 30 on the exterior of the pan 18. An electrical wire, unnumbered, extends from the socket 30 to an electrical source.

Mounted within the pan 18 between the end walls 20 and 21 and side walls 22 and 23 is an electrical heat element designated 29. The element 29 is a continuous rod 31 having one end extending from the electrical plug 28 and is preferably arranged in elongated loops or reaches having generally parallel sides and then terminating back in the electrical plug 28. The plug 30 is of a construction whereby it may be disengaged from the coupling socket 30.

The rod 31 is of any well-known construction including a resistance wire or current conductor 32, best seen in FIGURE 5, surrounded by a dielectric material 33 such as magnesium oxide. The dielectric material 33 is in turn surrounding by a metal sheath 34, preferably of a nickel alloy.

In the preferred embodiment, the metal sheath 34 is flattened at the top 35 for reasons to become apparent. However, such cross sectional configuration is not critical to the invention and any of the well-known sheathing configuration such as 34a and 34b shown in FIGURES 6 and 7 may be utilized.

In order to maintain the element 29 in a generally horizontal position and elevated above the bottom 19 of the pan 18, it rests on a pair of support bars 36 which extend between the side walls 22 and 23.

Placed above the physically contacting the heating element 29 is a grill member 38. It should be realized that whether the grill member 38 is a single structure or a pair of members such as illustrated in FIGURES 1 and 2 is immaterial to the invention.

The grill member 38 may be cast of any suitable metal, but it has been found that aluminum has proven to be a very adequate heat conductor. The grill member includes a plurality of spaced apart parallel ribs 39. Also, for best cooking, it is preferred that the space between the ribs should be of a distance corresponding to the widest breadth of a single rib 39.

The preferred embodiment of the ribs 39 is best seen in FIGURE 5. It will be noted that each rib is relatively wide at its base 40 and tapers upwardly to a relatively narrow flat top 41 being trapezoidal in cross section. Such construction will allow better distribution of heat from the element 29 to the individual ribs 39 of the grill member but yet concentrate the heat at the relatively narrow top 41 for best cooking and "branding" or searing of meat.

It is also desirable that the ribs 39 cross the elongated loops of the heating element 29. While FIGURE 1 illustrated the ribs as being at right angles thereto, such is not critical. In other words, for best results, some type of angular relationship between the ribs 39 and the loops of the rod 31 is desirable.

By the new and unique arrangement of parts set forth above, it can be seen that an edible such as meat that is placed on the grill member 38 will be cooked by both radiant and conductive heat. The heat from the rod 31 will pass upward between the ribs 39 to the meat by radiation. Such radiant heat will penetrate into the interior of the meat and achieve a proper and complete inner cooking. With the grill ribs 39 resting on and directly contacting the rod 31, heat from the rod 31 will be distributed into the ribs 39 conducted through the ribs in a single step to the meat that is in direct contact with the ribs. Such conductive cooking of the exterior of the meat will achieve a proper "branding" or searing of the meat and will also penetrate part of the way into the meat and augment the radiant cooking.

This arrangement and method of cooking will reduce the amount of time to cook an edible on a grill and will also help, in the case of meat, to immediately seal in the juices by the concentrated cooking.

With the preferred configuration of the rod 31 and ribs 39, it will be seen that greater surface areas are in contact with each other so that more heat may pass by conduction. Another advantage of the direct rib to rod contact is that there is less heat loss than when the ribs are only heated by radiation.

The modified form of this invention illustrated in FIGURE 2 shows a cooking grill designated 10a mounted in a counter-top 12a as a separate appliance. In this particular form, the grill member 38a is formed into two sections where the ribs 39a are arranged at other than right angles to the elongated loops of the rod 31. The pattern could be identified as a "herringbone arrangement." A control switch 43 is provided to regulate the heat of the heating element 29.

FIGURES 3 and 4 illustrate a modified form of the invention disclosed as a portable cooking grill 10b. In this form the invention consists of a pan 18a which is provided with legs 44 to elevate the grill 10b so as to insulate the grill from burning a table or counter-top.

The pan 18a is fitted with an electrical plug 28a extending into a collar 28b secured to the pan 18a, which plug is mateable with a socket 30 at a terminal end of an electrical cord 45.

The heating element 29a, as can be seen, is preferably arranged with the elongated loops of the rod 31 running the shorter width of the pan 18a. Additionally, the sheath 34a of this modification can be rounded with no flat top portion as illustrated in FIGURE 6 or can assume other configurations such as illustrated in FIGURES 5 and 7.

In order to support the element 29a, a support bar 36a is provided which extends between ends 20a and 21a of the pan 18a. A pair of sockets 48 are provided on ends 20a and 21a, respectively, to cradle the bar 36a and removably retain it in position.

The grill member 38b is a single unit having a plurality of ribs 47 which may be circular in cross section, as best seen in FIGURE 6. The ribs 47 also are in direct physical contact with the rod 31a so that conductive heat may be utilized to cook as well as radiant heat between the ribs 47.

While the drawings have illustrated specific rod configurations being used with grills 38 having ribs of specific cross section, any interchange of the respective rods and grills may be effected without departing from the invention. The essential requirement is that there be physical contact between the grill ribs 39 and the heating element 29.

Care has been taken in the development of the preferred as well as the modified forms of the cooking grill that the parts are all disengageable from each other and removable to facilitate the cleaning and maintenance of the grill.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claims so as to embrace any and all equivalent devices.

I claim:
1. A broiling device adapted to cook food such as meat by the simultaneous application of conductive and radiant heat, comprising:
   (a) an elongated electrical resistance element encased within a metallic heat conductive sheathing and arranged in a plurality of adjacent, substantially coplanar reaches to provide a generally planar upper grill supporting surface;
   (b) an independent, separate and removable metallic grill overlying and resting directly upon said grill-supporting surface, said grill comprising a plurality of generally parallel, spaced apart ribs and being in direct physical contact with said reaches only at contact points of limited area to receive by conduction a portion of the heat generated by said resistance element, said ribs being angularly disposed relative to the reaches of said resistance element and being generally regularly dispersed across the vertical boundary plane of said grill whereby substantial portions of said reaches are unobstructedly vertically exposed between said ribs for cooking by radiant heat an edible such as meat which is supported on said ribs out of physical contact with said reaches, said edible being simultaneously seared by conductive heat applied through direct contact with said ribs;
   (c) means for supporting said electrical resistance element; and
   (d) electrical terminal means provided for connecting said resistance element to a source of electrical energy whereby said resistance element can be heated to a temperature sufficient to broil said edible.

2. A cooking device as defined in claim 1, wherein the upper surfaces of the metallic heat conductive sheathing are relatively flat offering a large area of heat contact with said metallic grill.

3. A cooking device as defined in claim 1 wherein each of said ribs has a base portion of greater width than the top portion thereof.

4. A broiling device adapted to cook food such as meat by the simultaneous application of conductive and radiant heat, comprising:
   (a) an elongated electrical resistance element encased within a metallic heat conductive sheathing and arranged in a plurality of adjacent, substantially coplanar reaches to provide a generally planar upper grill supporting surface;

(b) an independent, separate and removable metallic grill overlying and resting directly upon said grill-supporting surface, said grill comprising a plurality of generally parallel, spaced apart ribs and being in direct physical contact with said reaches only at contact points of limited area to receive by conduction a portion of the heat generated by said resistance element, said ribs being angularly disposed relative to the reaches of said resistance element and being generally regularly dispersed across the vertical boundary plane of said grill whereby substantial portions of said reaches are unobstructedly vertically exposed between said ribs for cooking by radiant heat an edible such as meat which is supported on said ribs out of physical contact with said reaches, said edible being simultaneously seared by conductive heat applied through direct contact with said ribs;

(c) pan means for supporting said resistance element, said pan means including a bottom and said resistance element being spaced above said bottom;

(d) electrical terminal means provided for connecting said resistance element to a source of electrical energy terminating at said pan means whereby said resistance element can be heated to a temperature sufficient to broil said edible.

5. A cooking device as defined in claim 4 wherein the upper surfaces of the metallic heat conductive sheathing are relatively flat offering a large area of heat contact with said metallic grill.

6. A cooking device as defined in claim 4 wherein the metallic grill is formed in two independent and separate sections.

References Cited by the Examiner

UNITED STATES PATENTS

| 2,199,584 | 5/1940 | Bemis | 99—107 |
| 2,290,658 | 7/1942 | Volks | 219—455 X |
| 2,331,266 | 10/1943 | Cramer | 99—107 |
| 2,573,115 | 10/1951 | Sisto | 99—450 |
| 2,604,843 | 7/1952 | Davis | 99—450 |
| 2,812,706 | 11/1957 | Del Francia et al. | 99—446 |
| 2,856,502 | 10/1958 | Wolf | 99—445 X |
| 2,938,102 | 5/1960 | Savio | 99—446 X |

References Cited by the Applicant

UNITED STATES PATENTS

| 959,913 | 5/1910 | Berry. |
| 2,135,782 | 11/1938 | McBirney. |
| 2,290,658 | 7/1942 | Volks. |
| 2,764,080 | 9/1956 | Knapp. |
| 2,812,706 | 11/1957 | Del Francia et al. |

WILLIAM I. PRICE, *Primary Examiner.*

HYMAN LORD, WALTER A. SCHEEL, *Examiners.*

S. P. FISHER, *Assistant Examiner.*